(12) United States Patent
Kato et al.

(10) Patent No.: US 8,352,977 B2
(45) Date of Patent: Jan. 8, 2013

(54) INFORMATION PROCESSING METHOD AND APPARATUS PROGRAM STORAGE MEDIUM, PROGRAM AND INFORMATION RECORDING MEDIUM

(75) Inventors: Motoki Kato, Kanagawa (JP); Masanobu Nakamura, Tokyo (JP); Kazuhiko Nakamura, Osaka (JP); Tomotaka Yagi, Hyogo (JP); Declan Patrick Kelly, Eindhoven (NL); Wilhelmus Jacobus van Gestel, Heeze (NL)

(73) Assignees: Sony Corporation, Tokyo (JP); Panasonic Corporation, Kadoma-shi (JP); Koninklijke Philips Electronics N.V., Eindhoven (NL)

( * ) Notice: Subject to any disclaimer, the term of this patent is extended or adjusted under 35 U.S.C. 154(b) by 1489 days.

(21) Appl. No.: 10/470,312

(22) PCT Filed: Nov. 29, 2002

(86) PCT No.: PCT/JP02/12560
§ 371 (c)(1),
(2), (4) Date: Jan. 23, 2004

(87) PCT Pub. No.: WO03/047244
PCT Pub. Date: Jun. 5, 2003

(65) Prior Publication Data
US 2005/0063669 A1    Mar. 24, 2005

(30) Foreign Application Priority Data
Nov. 30, 2001 (JP) .................. P2001-365630

(51) Int. Cl.
*H04H 60/33* (2008.01)
*H04H 60/32* (2008.01)
*G06F 3/00* (2006.01)
*G06F 13/00* (2006.01)
*H04N 5/445* (2006.01)
*H04N 7/16* (2011.01)

(52) U.S. Cl. ........................................................ 725/19
(58) Field of Classification Search ...................... 725/19
See application file for complete search history.

(56) References Cited

U.S. PATENT DOCUMENTS

| 5,544,318 | A | * | 8/1996 | Schmitz et al. ............. 709/207 |
| 5,610,653 | A | * | 3/1997 | Abecassis ................. 348/170 |
| 5,801,685 | A | * | 9/1998 | Miller et al. .............. 715/202 |
| 6,041,161 | A |   | 3/2000 | Okamoto et al. |
| 6,081,264 | A | * | 6/2000 | Rosen et al. ............... 715/723 |

(Continued)

FOREIGN PATENT DOCUMENTS
EP   1 103 974 A2   5/2001
(Continued)

*Primary Examiner* — Justin Shepard
(74) *Attorney, Agent, or Firm* — Oblon, Spivak, McClelland, Maier & Neustadt, L.L.P.

(57) ABSTRACT

The characteristic playback domain of an AV stream is to be reproduced simply and reliably without complicating the management. As marks representing characteristic points of an AV stream, a mark of the type indicating a point and a mark of the type indicating a section (duration) are provided. The mark of the type indicating a point designates a point with a time stamp corresponding to a preset playback timing of the AV stream. The mark of the type indicating a section specifies the domain based on the time stamp of the playback start point of the preset playback domain of the AV stream and on the duration as from the playback start point until the playback end point.

20 Claims, 7 Drawing Sheets

U.S. PATENT DOCUMENTS

| | | | |
|---|---|---|---|
| 6,175,683 B1 | 1/2001 | Sugimura et al. | |
| 6,269,063 B1 | 7/2001 | Fujinami et al. | |
| 6,363,525 B1 * | 3/2002 | Dougherty et al. | 725/34 |
| 6,567,983 B1 * | 5/2003 | Shiimori | 725/105 |
| 6,961,954 B1 * | 11/2005 | Maybury et al. | 725/53 |
| 6,999,674 B1 * | 2/2006 | Hamada et al. | 386/241 |
| 7,337,462 B2 * | 2/2008 | Dudkiewicz et al. | 725/136 |
| 7,519,273 B2 * | 4/2009 | Lowthert et al. | 386/95 |
| 2001/0004403 A1 * | 6/2001 | Warnick et al. | 382/173 |
| 2001/0023436 A1 * | 9/2001 | Srinivasan et al. | 709/219 |
| 2001/0024336 A1 | 9/2001 | Looijkens | |
| 2003/0009371 A1 * | 1/2003 | Gauba et al. | 705/10 |
| 2003/0204852 A1 * | 10/2003 | Fenwick et al. | 725/83 |

FOREIGN PATENT DOCUMENTS

| | | |
|---|---|---|
| EP | 1 206 141 | 5/2002 |
| JP | 3158897 | 2/2001 |
| JP | 3159041 | 2/2001 |
| JP | 2002-152688 | 5/2002 |
| WO | WO 00/45388 | 8/2000 |
| WO | WO 01/52530 | 7/2001 |

* cited by examiner

| Syntax | No. of Bytes | Mnemonic |
|---|---|---|
| PlayListMark() { | 32 | uimsbf |
|    length | 16 | uimsbf |
|    number_of_PlayList_marks | | |
|    for (i=0;i<*number_of_PlayList_marks*;i++){ | 8 | uimsbf |
|      mark_type | 16 | uimsbf |
|      marker_ID | 16 | uimsbf |
|      ref/to/PlayItem/id | 32 | uimsbf |
|      mark_time_stamp | 32 | bslbf |
|      duration | 32 | bslbf |
|      makers_private_data | | |
|    } | | |
| } | | |

FIG.4

| Syntax | No. of Bytes | Mnemonic |
|---|---|---|
| ClipMark() { | | |
|    length | 32 | uimsbf |
|    if (length !=0) { | | |
|    maker_ID | 16 | uimsbf |
|    number_of_Clip_marks | 16 | uimsbf |
|    for (i=0; i<*number_of_Clip_marks*; i++){ | | |
|      mark_type | 8 | uimsbf |
|      ref_to_STC_id | 8 | uimsbf |
|      mark_time_stamp | 32 | uimsbf |
|      duration | 32 | bslbf |
|      makers_private_data | 32 | bslbf |
|    } | | |
|   } | | |
| } | | |

FIG.5

```
┌─────────────────────────────────────┐
│ START REPLAY USING SECTION INDICATING│
│   TYPE PlayListMark/ClipMark        │
└─────────────────────────────────────┘
                 │        S61
                 ▼       ╱
┌─────────────────────────────────────┐
│   USER COMMNADS REPLAY OF ONE PlayList│
└─────────────────────────────────────┘
                 │        S62
                 ▼       ╱
┌─────────────────────────────────────┐
│ USER COMMANDS CONTROLLER 17 TO USE  │
│  A REPLAY METHOD EMPLOYING SECTION  │
│             TYPE MARK               │
└─────────────────────────────────────┘
                 │        S63
                 ▼       ╱
┌─────────────────────────────────────┐
│  CONTROLLER 17 ACQUIRES PlayListMark │
│   AND ClipMark PERTINENT TO PlayList │
└─────────────────────────────────────┘
                 │        S64
                 ▼       ╱
┌─────────────────────────────────────┐
│  CONTROLLER 17 ACQUIRES MARK DATA   │
│  NECESSARY FOR PRESET REPLAY METHOD │
└─────────────────────────────────────┘
                 │        S65
                 ▼       ╱
┌─────────────────────────────────────┐
│ CONTROLLER 17 REPRODUCES AV STREAM  │
│   FROM RECORDING MEDIUM BASED ON    │
│    MARK TIME STAMP AND duration     │
└─────────────────────────────────────┘
                 │        S66
                 ▼       ╱
┌─────────────────────────────────────┐
│   CONTROLLER 17 PROCESSES REPLAY    │
│ PICTURE BASED ON makers_private_data│
│              OF MARK                │
└─────────────────────────────────────┘
                 │
                 ▼
              ( END )
```

FIG.9

INFORMATION PROCESSING METHOD AND APPARATUS PROGRAM STORAGE MEDIUM, PROGRAM AND INFORMATION RECORDING MEDIUM

TECHNICAL FIELD

This invention relates to a method and apparatus for processing the information, a program and to an information recording medium. More particularly, it relates to a method and apparatus for processing the information, a program and to an information recording medium whereby any desired position of an AV stream can be accessed speedily.

This application claims priority of Japanese Patent Application No. 2001-365630, filed on Nov. 30, 2001, the entirety of which is incorporated by reference herein.

BACKGROUND ART

Recently, a variety of optical discs have been proposed as disc-shaped recording mediums that are recordable and that can be dismounted from a recording and/or reproducing apparatus. These recordable optical discs have been proposed as large-capacity mediums of several GBs and are felt to be promising as mediums for recording AV (audio visual) signals, such as video signals.

Among the encoding systems for digitally compressing digital video signals, there is an MPEG (Moving Picture Experts Group) 2 system. The MPEG2 is also finding application in recording digital video signals on recording mediums. For example, in recording digital video signals on a recording medium, the video signals are encoded in accordance with the MPEG2 system to record an encoded bitstream on a recording medium. In the digital television (TV) broadcast, which recently made its debut, a video program, encoded in accordance with the MPEG2 system, is transmitted in accordance with the format termed a transport stream. In recording the digital broadcast on an information recording medium, such a system is used in which the transport stream is recorded in the form of digital signals, without decoding or re-encoding.

If AV signals are recorded on a recording medium, random access reproduction, such as locating or fast-feed reproduction of AV signals, can be realized readily. Using this feature, it is possible for a user to select an optional reproduction domain, specified by an IN point (in-point) and OUT point (out-point) from the recorded AV signals to formulate the playback route of the AV signals freely. This function is routinely termed a play-list reproduction. For example, in the DVD recording standard (DVD specifications for Rewritable/Re-Recordable Discs, Part 3 Video Recording, Version 1.0, September 1999), the playlist reproduction is prescribed as PGC or Original PGC.

The user is also able to select a start point of a favorite scene to record the reproduction information on the locating point information. This function is termed a characteristic point or a mark and, in, for example, the DVD video recording standard, the function is prescribed as being the Movie Cell Entry Point Information (M_C_EPI).

If, in case the user has selected an optional reproduction domain (start and end points) from a given playlist, a function which affords a particular meaning to the reproduction domain is to be implemented, the following two methods may be contemplated.

The first method is such a method in which, in case a user has selected the specified playback domain from the playlist, a separate playlist, having the playback domain as a playback route, is prepared. This method suffers from a drawback that the number of playlists is increased even although the user is not desirous to prepare separate playlists.

The second method is such a method in which, in case a user has selected the specified playback domain from the playlist, the domain so selected is indicated using two marks, namely a start mark and an end mark. This method, however, suffers from a drawback that not only the number of the mark information is increased but also the reproducing or editing operation employing the mark is complicated because the two marks representing the domain must be managed as a pair.

If a moving picture of an optional characteristic moving picture is selected from the input AV stream, and a function which accords a particular meaning to the domain is to be implemented, such a method may be envisaged in which the domain is indicated by, for example, two marks, namely a start mark and an end mark. This method, however, suffers from a drawback that the number of the mark information is increased, and that, since the two marks indicating the domain must be managed as a pair, the management method for mark recording and/or reproduction tends to be complicated.

DISCLOSURE OF THE INVENTION

In view of the above-described status of the prior art, it is an object of the present invention to provide an arrangement which, when a user selects an optional playback domain from a given playlist and proceeds to realize a function of according a particular meaning to this domain, facilitates the management of recording and/or reproduction of the playback domain.

Moreover, when the user selects a moving picture of an optional characteristic playback domain from the input AV stream, and proceeds to implement a function which accords a particular meaning to the domain, it is desirable to permit the recording and/or reproduction of the playback domain to be supervised readily.

A first information processing apparatus of the present invention includes detection means for detecting a moving picture of a characteristic playback domain from an input AV stream, generating means fir generating a time stamp of a playback start point of the playback domain and a clip mark having the duration of the playback domain, and recording means for recording the clip mark on an information recording medium.

There may also be provided acquisition means for acquiring extension data. The generating means appends the extension data acquired by the acquisition means to the clip mark.

A first information processing method of the present invention includes a detection step of detecting a moving picture of a characteristic playback domain from an input AV stream, a generating step of generating a time stamp of a playback start point of the playback domain and a clip mark having the duration of the playback domain, and a recording step of recording the clip mark on an information recording medium.

A first program of a program storage medium of the present invention includes a detection step of detecting a moving picture of a characteristic playback domain from an input AV stream, a generating step of generating a time stamp of a playback start point of the playback domain and a clip mark having the duration of the playback domain, and a recording step of recording the clip mark on an information recording medium.

A first program of the present invention includes a detection step of detecting a moving picture of a characteristic playback domain from an input AV stream, a generating step of generating a time stamp of a playback start point of the playback domain and a clip mark having the duration of the playback domain and a recording step of recording the clip mark on an information recording medium.

A first information recording medium of the present invention has recorded thereon a time stamp for a playback start point of a characteristic playback domain detected from the AV stream and a clip mark having the duration of the playback domain.

A second information processing apparatus of the present invention includes acquisition means for acquiring the clip mark from the information recording medium, and control means for controlling the processing of the information recorded on the information recording medium, based on the clip mark acquired from the acquisition means.

A second information processing method of the present invention includes an acquisition step of acquiring the clip mark from the information recording medium, and a control step of controlling the processing of the information recorded on the information recording medium, based on the clip mark acquired from the acquisition step.

A second program for a program storage medium of the present invention includes an acquisition step of acquiring the clip mark from the information recording medium, and a control step of controlling the processing of the information recorded on the information recording medium, based on the clip mark acquired from the acquisition step.

A second program of the present invention includes an acquisition step of acquiring the clip mark from the information recording medium, and a control step of controlling the processing of the information recorded on the information recording medium, based on the clip mark acquired from the acquisition step.

A third information processing apparatus of the present invention includes first acquisition means for acquiring an optional playback domain, as instructed by a user, from a playlist which gives a definition of a combination of preset domains in an AV stream, generating means for generating a playlist mark having a time stamp of a start point of a playback domain, and a duration of the playback domain, and recording means for recording the playlist mark on the information recording medium.

The information processing apparatus also includes second acquisition means for acquiring extension data. The generating means appends the extension data, acquired by the second acquisition means, to the playlist mark.

A third information processing method of the present invention includes an acquisition step of acquiring an optional playback domain, as instructed by a user, from a playlist which gives a definition of a combination of preset domains in an AV stream, a generating step of generating a playlist mark having a time stamp of a start point of a playback domain, and a duration of the playback domain, and a recording step of recording the playlist mark on the information recording medium.

A third program for a program storage medium of the present invention includes an acquisition step of acquiring an optional playback domain, as instructed by a user, from a playlist which gives a definition of a combination of preset domains in an AV stream, a generating step of generating a playlist mark having a time stamp of a start point of a playback domain and a duration of the playback domain, and a recording step of recording the playlist mark on the information recording medium.

A third program of the present invention allows a computer to execute an acquisition step of acquiring an optional playback domain, as instructed by a user, from a playlist which gives a definition of a combination of preset domains in an AV stream, a generating step of generating a playlist mark comprised of a time stamp of a start point of the playback domain, and a duration of the playback domain, and a recording step of recording the playlist mark on the information recording medium.

A second information recording medium of the present invention has further recorded thereon playlist mark comprised of a time stamp of a relay start point of an optional playback domain as instructed by the user, from a playlist which gives a definition of preset domains in the AV stream, and a duration of the playback domain.

A fourth information processing apparatus of the present invention includes acquisition means for acquiring the playlist mark from the information recording medium, and control means for controlling the processing of the information recorded on the information recording medium based on the playlist mark acquired by the acquisition means.

A fourth information processing method of the present invention includes an acquisition step of acquiring the playlist mark from the information recording medium, and a control step of controlling the processing of the information recorded on the information recording medium based on the playlist mark acquired by the acquisition step.

A fourth program for the program storage medium of the present invention includes an acquisition step of acquiring the playlist mark from the information recording medium, and a control step of controlling the processing of the information recorded on the information recording medium based on the playlist mark acquired by the acquisition step.

A fourth program of the present invention includes an acquisition step of acquiring the playlist mark from the information recording medium, and a control step of controlling the processing of the information recorded on the information recording medium based on the playlist mark acquired by the acquisition step.

In the information processing apparatus and method, program storage medium, program and information recording medium, according to the first aspect of the present invention, the time stamp of the playback start point of the characteristic playback domain, as detected from the AV stream, and the clip mark having the duration of the playback domain, are recorded on the information recording medium.

In the information processing apparatus and method, program storage medium, program and information recording medium, according to the second aspect of the present invention, the processing of the information recorded on the information recording medium is controlled based on the clip mark acquired from the medium.

In the information processing apparatus and method, program storage medium, program and information recording medium, according to the third aspect of the present invention, the time stamp of the playback start point and the playlist mark including the duration of the playback domain as prescribed by the playback start point and the playback end point are recorded on the information recording medium.

In the information processing apparatus and method, program storage medium, program and information recording medium, according to the fourth aspect of the present invention, the processing of the information recorded on the information recording medium is controlled based on the playlist mark acquired from the medium.

BRIEF DESCRIPTION OF THE DRAWINGS

FIG. 4 illustrates the syntax of the PlayListMark( ).

FIG. 5 illustrates the syntax of the ClipMark( ).

FIG. 9 is a flowchart for illustrating the method for reproducing the PlayList using the PlayListMark/ClipMark of the section indicating type.

BEST MODE FOR CARRYING OUT THE INVENTION

Figure 1:
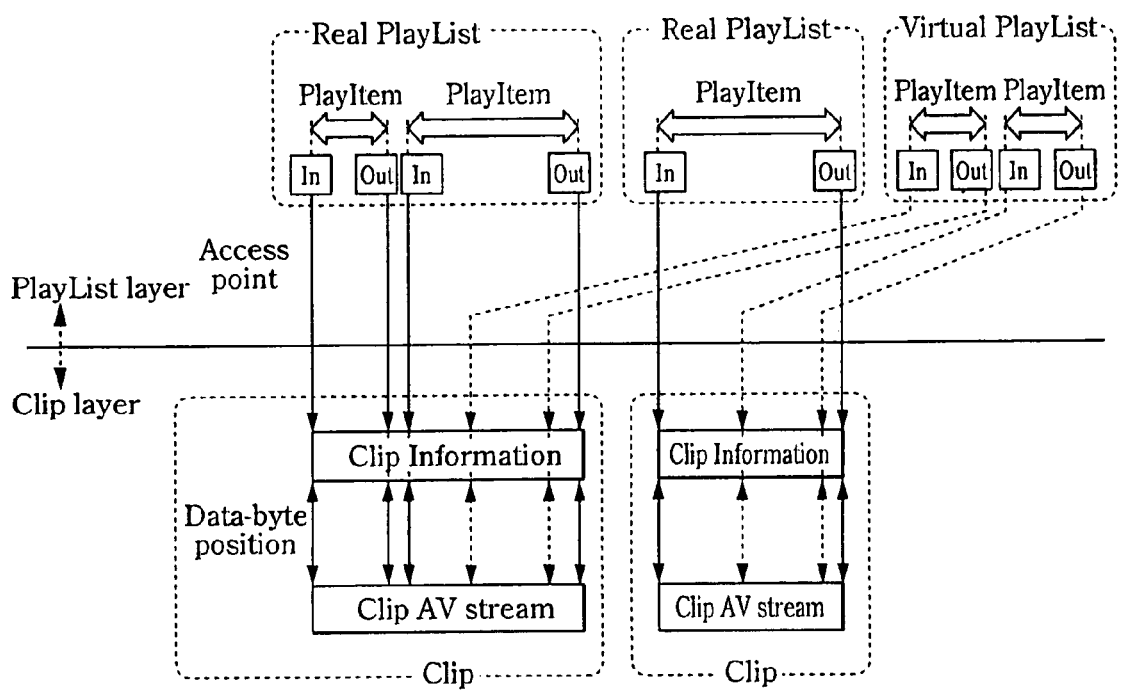
FIG. 1 illustrates a simplified structure of an application format on a recording medium employed in a recording and/or reproducing system.

FIG. 1 shows a simplified structure of an application format on a recording medium employed in a recording and/or reproducing system embodying the present invention. This format has two layers, namely a PlayList and a Clip, for managing an AV stream.

One AV stream and its subsidiary information, paired together, are thought of as an object, and are termed a Clip. An AV stream file is termed a Clip AV stream file, while its subsidiary information is termed the clip information file.

One Clip AV stream file is comprised of data corresponding to the MPEG2 transport stream arrayed in a structure prescribed in accordance with the DVR application format.

In general, a data file, used in e.g., a computer, is handled as a byte string. The contents of the Clip AV stream file are expanded on the time axis. The PlayList specifies an access point in the Clip by a time stamp. When the PlayList specifies the access point to the Clip by a time stamp, the Clip information file is useful for finding the address information at which to start the decoding of a stream in the Clip AV stream file. To this end, the Clip information file has a table showing the time stamp to address correspondence for time search in the Clip AV stream.

The PlayList was introduced in order for a user to select the reproduction domain he or she desires to view, and to readily edit the so selected reproduction domain. One PlayList is a set of reproduction domains in a Clip. One reproduction domain in a given Clip is termed the PlayItem. It is represented by a pair of the IN and OUT points on the time axis. Consequently, the PlayList is a set of PlayItems.

The PlayList is of two types, one PlayList type being Real PlayList, with the other being Virtual PlayList.

The Real PlayList is deemed to co-own a stream portion of the clip it is referencing. That is, the Real PlayList occupies, in a disc, a data capacity corresponding to the stream portion of the clip it is referencing. When an AV stream is recorded as a new clip, a Real PlayList, referencing the reproducible range of the entire clip, is created automatically. If a portion of the reproducible range of the PlayList is erased, data of the stream portion of the clip it is referencing is erased.

The Virtual PlayList is deemed not to co-own clip data. If the Virtual PlayList is changed or erased, the clip is not changed whatsoever.

In the following explanation, the Real PlayList and the Virtual PlayList are comprehensively referred to simply as the PlayList.

Figure 2:
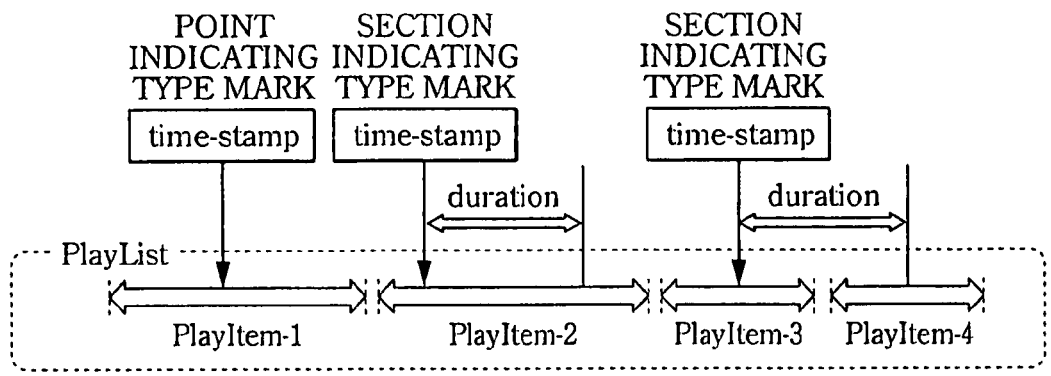
FIG. 2 illustrates a mark on the PlayList.

A mark is used for highlighting or specifying characteristic time in the clip or the PlayList The mark appended to the PlayList is termed the PlayListMark and is mainly set by the user. The PlayList has two types (see FIG. 2). One is a mark of the type indicating a point and is shown by a time stamp specifying the point. The other is a mark specifying a section and is indicated by a time stamp indicating the start point of a section and by the duration of the section. An illustrative example of the mark of the type indicating the point is a start point of a user's favorite scene. An illustrative example of the mark of the type indicating a section is a domain of a user's favorite scene.

A mark appended to the clip is termed a ClipMark specifying a characteristic scene relevant to the contents of the AV stream. The ClipMark has two types (see FIG. 3), one being a mark of the type indicating a point and is indicated by a time stamp indicating the point. The other is a mark of the type indicating a section and is shown by a time stamp indicating the start point and the duration of the section. An illustrative example of the mark indicating the section is a domain of a characteristic scene. When a PlayList is reproduced, a reproducing equipment is able to reference a mark of the clip the PlayList is referencing.

Figure 3:
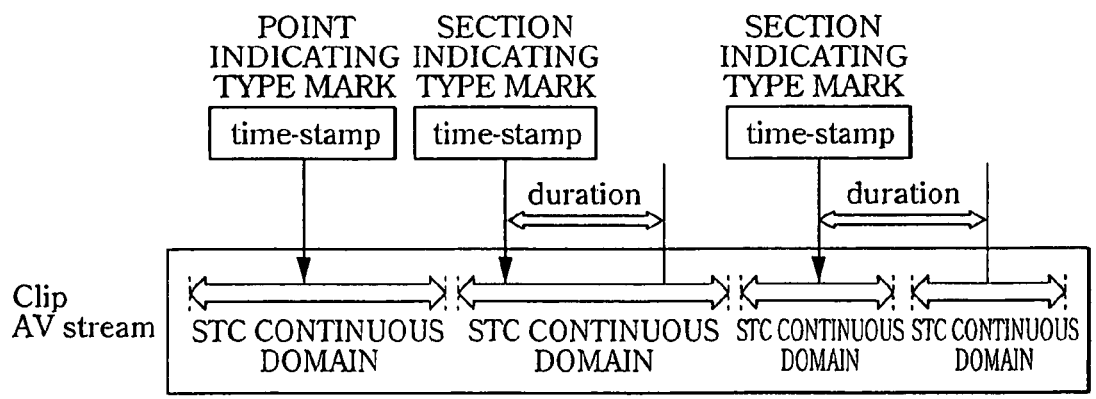
FIG. 3 illustrates a mark on the Clip.

In FIG. 3, the STC continuous domain indicates a domain in which time clocks of a system, where there is placed the time stamp of the mark, occur uninterruptedly.

FIG. 4 shows a syntax of the PlayListMark( ) which is a database where the PlayListMark is stored. The PlayListMark( ) belongs to the PlayList file.

The length denotes the number of bytes from a byre directly following the length field up to the last byte of the PlayListMark( ).

The number_of_PlayList_marks denotes the number of entries of the marks stored in the PlayListMark( ).

The mark_type denotes the mark type and at least denotes whether the mark is of the point type or the section type. The type of the point or the section may also be included in the meaning of the mark_type.

The maker_ID denotes an identification number of a maker who manufactured a recording equipment in the PlayListMark( ) of which the mark thereof has been stored.

The ref_to_PlayItem_id denotes the identification number of the PlayItem specifying the PlayItem where the mark is placed.

If the mark is of the point type, a time stamp indicating the point is stored. If the mark is of the section type, the time stamp indicating the start point of the section is stored. The mark_time_stamp denotes the time in the reproduction range specified by IN_time and OUT_time defined in the PlayTime shown by ref_to_PlayItem_id.

If the mark is of the section type, the duration denotes the duration of the section. This duration may be closed in the PlayItem shown by ref_to_PlayItem_id, or be astride the PlayItem contiguous to the aforementioned PlayItem.

The makers private_data is a field freely usable by a user shown by the maker_ID. The meaning peculiar to the maker may also be afforded to its mark. For example, if, in the case of section type mark, a domain shown by the duration is to be reproduced, the makers_private_data may be used for specifying fade-in or fade-out reproduction.

FIG. 5 shows the syntax of the ClipMark( ) as a data base in which to store the ClipMark. The ClipMark belongs to the file of the Clip Information.

The length denotes the number of bytes from the byte directly following the length field to the last byte of the ClipMark( ).

The maker_ID denotes an identification number of a maker (manufacturer) of the recording equipment formulating the ClipMark( ).

The number_of Clip marks denotes the number of entries of marks stored in the ClipMark.

The mark_type denotes the type of marks and at least denotes whether the mark is of the point type or the section type. Moreover, the types of the points or sections may also be afforded to the meaning of the mark_type.

The ref_to_STC_id denotes the identification number for specifying the time axis of the time clocks of the system where the time stamp shown by the mark_time_stamp is put. It is noted that the time axis of the system time clocks is the time axis referenced by the reproduction time stamp of the video in the Clip AV stream.

If the mark is of the point type, the mark_time_stamp stores the time stamp denoting a point. If the mark is of the section type, the time stamp indicating the section start time is stored. The mark_time_stamp denotes the time on the time axis of the system time clocks indicated by ref_to_STC_id.

If the mark is of the section type, the duration denotes the duration of the section. This duration may be closed in the time axis of the system time clocks shown by ref_to_STC_id, or be astride the PlayItem contiguous to the time axis of the system time clocks.

The makers_private_data is a field freely usable by a user shown by the maker_ID. The meaning peculiar to the maker may also be afforded to its mark. For example, if, in the case of section type mark, the domain shown by the duration is to be reproduced, the makers_private_data may be used to indicate that the domain is to be skip-reproduced.

Figure 6:
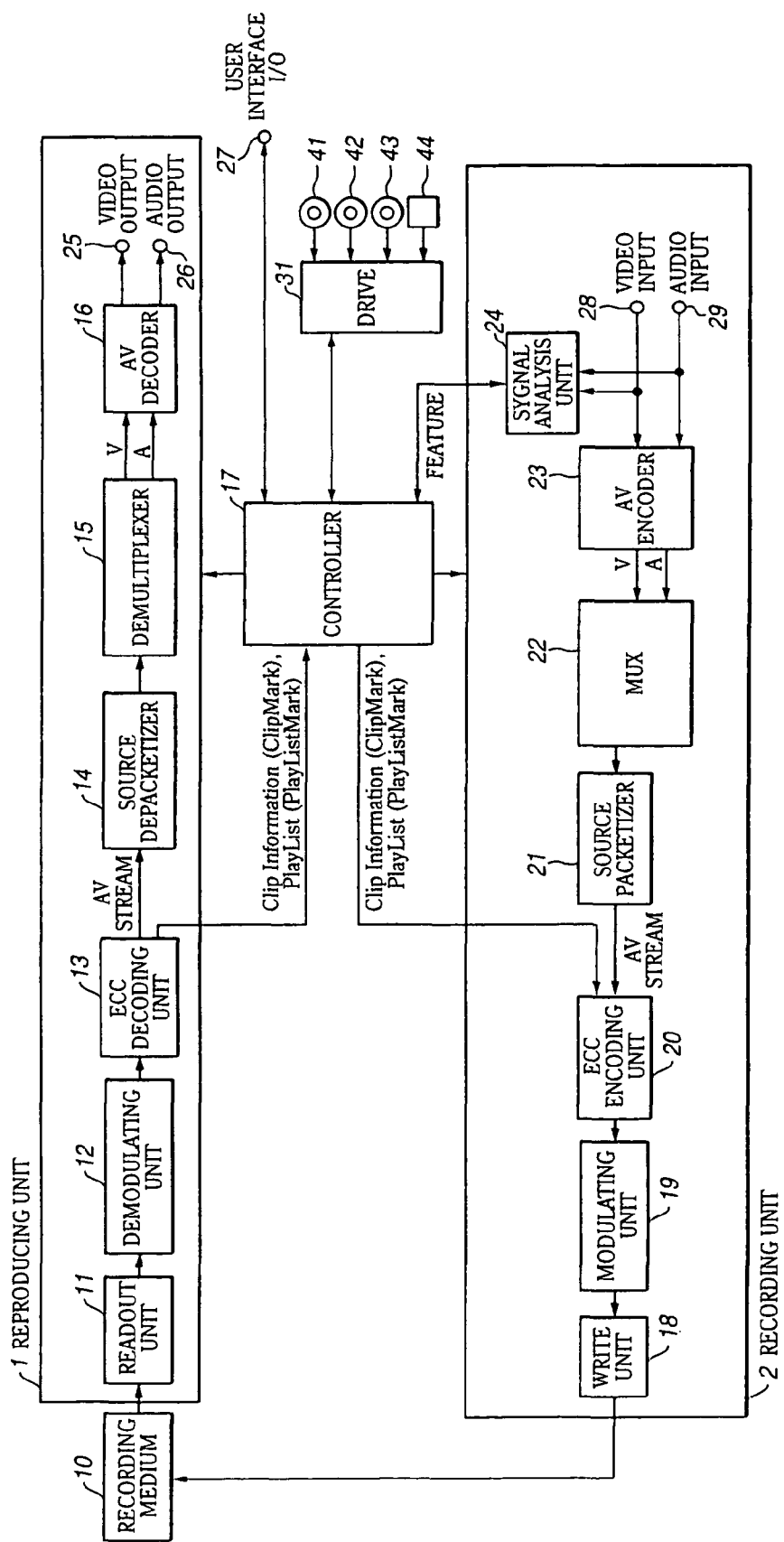
FIG. 6 is a block diagram showing the structure of a moving picture recording and/or reproducing apparatus.

Referring to the block diagram of FIG. 6, showing the moving picture recording and/or reproducing apparatus in a system for recording and/or reproducing data of a DVR application structure, is now explained. This moving picture recording and/or reproducing apparatus is made up of a reproducing unit 1 and a recording unit 2.

First, the operation for recording is explained for a case where input audio visual signals are encoded and recorded.

From the terminals 28, 29 are input video and audio signals, respectively. The video and audio signals are input to a signal analysis unit 24 and to an AV encoder 23, respectively. The AV encoder 23 encodes the input video and audio signals to output an encoded video stream V and an encoded audio stream A to a multiplexer 22. The encoded video stream V is e.g., an MPEG2 video stream, whilst the encoded audio stream A is e.g., an MPEG1 audio stream or a Dolby (trade mark) AC3 audio stream.

The multiplexer 22 multiplexes an input stream to output a multiplexed stream. The multiplexed stream is e.g., an MPEG2 transport stream or an MPEG2 program stream. The multiplexed stream is input to a source packetizer 21, which encodes the input multiplexed stream into an AV stream, composed of source packets, in accordance with an application format of the recording medium. The AV stream is processed by an ECC (error correction coding) unit 20 and a modulation unit 19 and thence sent to a writing unit 18, which writing unit 18 then records the AV stream file on a recording medium 10 in accordance with control signals as commanded by a controller 17.

The present moving picture recording and/or reproducing apparatus records the Clip AV stream file, while recording the application database information, relevant to the file, that is the Clip information file and the PlayList file. These application database information are also prepared by the controller 17.

The Clip Information file includes ClipMark( ). The Clip-Mark( ) is prepared on the basis of the information input from the signal analysis unit 24 to the controller 17. The PlayList file is prepared mainly on the basis of the user's command information as input via a terminal 27 from the user interface.

The characteristic information from the signal analysis unit 24 is automatically generated by this moving picture recording and/or reproducing apparatus. The signal analysis unit 24 analyzes the contents of the input video audio signals and detects a characteristic picture in the input moving picture to output a time stamp of the picture indicating the start point and the end point of the characteristic point to the controller 17. For example, the start and end points of the characteristic point include program start and end points in the input video signals and start and end points of a CM (commercial message). The controller 17 formulates the ClipMark( ), based on the time stamp of the picture of the start and end points of the input characteristic points.

If the mark is of the point type, the controller 17 stores only the time stamp of the start point in the ClipMark( ). If the mark is of the section type, the time stamp of the start point (mark_time_stamp) and the duration as from the start point up until the end point are stored in the ClipMark( ). The controller 17 is also able to append extension data (makers_private_data) to the mark.

The user's command information, input from the terminal 28, includes the information on the favorite reproduction domain in the AV stream and the information on the start and end points of the user's favorite scene. These user command information are stored in the database of the PlayList. The controller 17 formulates the PlayListMark( ) based on the time stamp of the picture of the start and end points of the user's favorite scene, as acquired from the information of the scene as entered. If the mark is of the point type, only the time stamp of the start point is stored in the PlayListMark( ). If the mark is of the section type, the time stamp of the start point (mark_time_stamp) and the time duration since the start time point until the end time point (duration) are stored in the PlayListMark( ). The controller 17 is also able to append the extension data (makers_private_data) to the mark.

Based on the above-mentioned input information, the controller 17 formulates the database of the AV stream (Clip information) and of the PlayList. Similarly to the AV stream, the above database information are processed by the ECC (error correction coding) unit 20 and the modulation unit 19 so as to be sent to the writing unit 18. The writing unit 18 then records the database file on the recording medium 10 based on the control signal as commanded from the controller 17.

The operation at the time of reproduction is now explained.

On the recording medium 10, there are recorded the Clip AV stream file and the application database information.

First, the controller 17 commands a readout unit 11 to read out the application database information. The readout unit then reads out the application database information from the recording medium and routes the so read out database information through a demodulating unit 12 and an ECC (error correction coding) unit 13 to a controller 17.

Based on the application database information, the controller 17 causes an overview of the PlayList, recorded on the recording medium (disc) 10, to be output from a terminal 27 to the user interface. Using the user interface, the user selects the PlayList, desired to be reproduced, from the overview of the PlayList. The PlayList, specified for reproduction, is input from the terminal 27 to the controller 17.

The controller 17 commands the readout unit 11 to read out the AV stream file, necessary for reproduction of the PlayList. The readout unit 11 reads out the AV stream from the recording medium 10. The AV stream is input to a source depacketizer 14 through the demodulation unit 12 and the error correction coding unit 13.

The source depacketizer 14 converts the AV stream of the application format of the recording medium 10 into a stream that can be input to a demultiplexer 15. The demultiplexer 15 inputs the video stream V and the audio stream A, forming the reproduction domain (PlayItem) of the AV stream as specified by the controller 17, to an AV decoder 16. The AV decoder 16 decodes the video stream and the audio stream to output the playback video signals and the playback audio signals to terminals 25, 26, respectively.

It is assumed that the PlayList is now to be reproduced, using the PlayListMark or the ClipMark.

First, the user commands a reproducing method, employing a certain mark, from a list of mark points stored in the ClipMark( ) or in the PlayListMark( ). For example, this operation is carried out in such a manner that a list of thumbnail pictures of mark points stored in the ClipMark( ) or in the PlayListmark( ), is displayed on the user interface, and that the user then selects a thumbnail picture the or she desires from among these thumbnail pictures.

The controller 17 commands the readout unit 11 to read out the AV stream as commanded by the mark time stamp of the mark. Specifically, when the time stamp of the mark is acquired, the controller 17 decides the readout position of the AV stream from the recording medium, based on the table for time search, showing the relationship between the time stamp and the addresses, as stored in the Clip Information file, to command the readout unit 11 to read out the AV stream.

The readout unit 11 reads out data from the specified address. The read-out data are input, through the demodulation unit 12, error correction coding unit 13 and the source depacketizer 14, to the demultiplexer 15, so as to be decoded by the AV decoder 16 to reproduce the AV data denoted by the mark.

If extension data (makers_private_data) are appended to the mark, special reproduction may be performed on the basis of its contents. For example, if the extension data of the mark of the section type indicates fade-in or fade-out reproduction, the domain represented by the section may be so reproduced.

Figure 7:
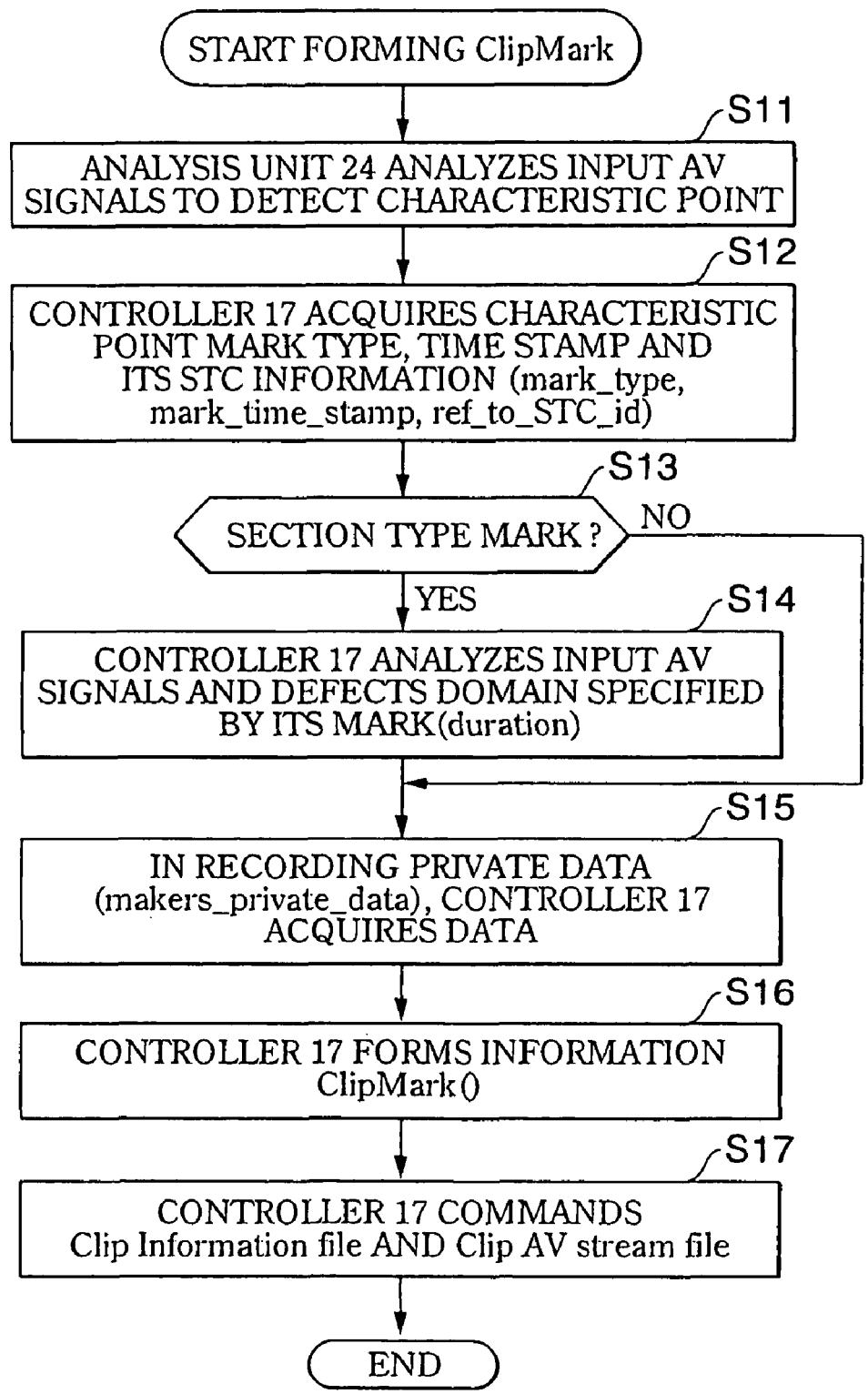
FIG. 7 is a flowchart for illustrating the method for formulating the ClipMark.

Referring to FIG. 7, the method for the moving picture recording and/or reproducing apparatus to formulate Clip-Mark is hereinafter explained.

At step S11, the signal analysis unit 24 analyzes video and audio signals, input from the terminals 28 and 29, to detect the characteristic points of the signals.

At step S12, the controller 17 acquires the mark type, time stamp and the STC information of the characteristic points, analyzed at step S11 by the signal analysis unit 24, that is it acquires mark_type, mark_time_stamp and ref_to_STC_id, as shown in FIG. 5.

At step S13, the controller 17 verifies whether or not the mark_type as acquired at the processing of step S12 indicates a mark of the section type. If the mark_type indicates a mark of the section type, the controller 17 proceeds to step S14 to analyze the input audio and video signals to detect the domain (duration) indicated by the mark, If, at step S13, the mark_type is verified to be not a mark of the section type, the processing of step S14 is skipped.

The controller 17 proceeds to step S15 where, if private data (makers_private_data) is to be recorded, the controller 17 acquires the data, input from the signal analysis unit 24, or acquires the data input from the user interface through terminal 27.

At step S16, the controller 17 formulates the information on the ClipMark( ) (FIG. 5), based on the data acquired by the above-described processing.

At step S17, the controller 17 commands the writing unit 18 to record the Clip Information file and the Clip AV stream file. Based on these commands, the writing unit 18 records these files in the recording medium 10.

Figure 8:
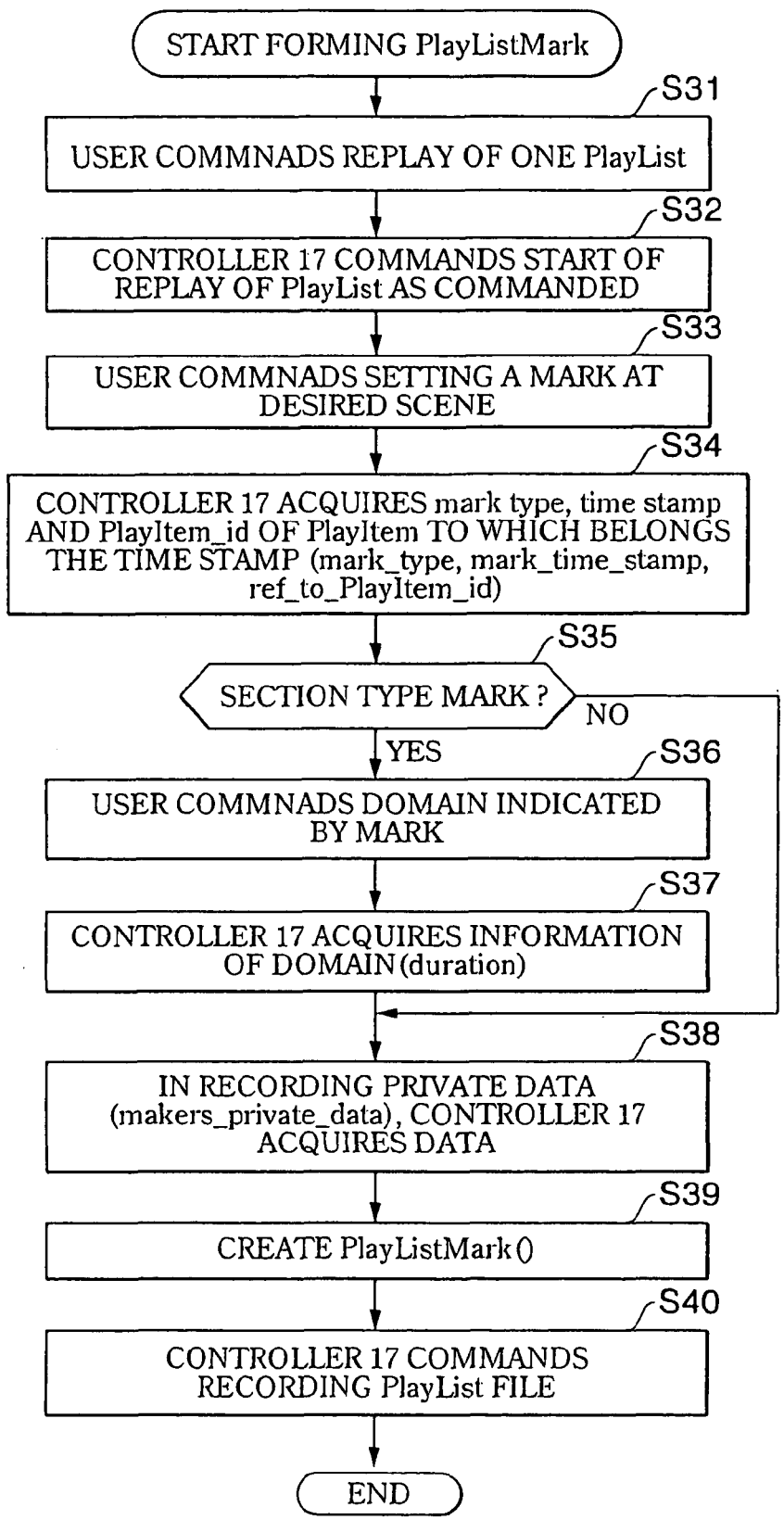
FIG. 8 is a flowchart for illustrating the method for formulating the PlayListMark( ).

Referring to FIG. 8, the method for formulating the Play-ListMark by the moving picture recording and/or reproducing apparatus is explained.

When the user commands reproducing one PlayList at step S31, this command is input from the user interface over terminal 27 to the controller 17.

At step S32, the controller 17 commands the readout unit 11 to commence the playback of the PlayList as commanded at step S31.

At step S33, the user actuates an interface to command the controller 17 from terminal 27 to set the mark at a desired scene position.

At step S34, the controller 17 executes the processing corresponding to the command at step S33. That is, the controller 17 acquires the mark type, time stamp and the Play-Item_id of the PlayItem to which belongs the time stamp (that is it acquires the mark_type, mark_time_stamp and ref_to_PlayItem_id) (see FIG. 4).

At step S35, the controller 17 verifies whether or not the mark type is the mark of the section type. If the mark type is the section type mark, the controller 17 proceeds to step S36 where the user specifies the domain indicated by the mark. For example, the user specifies the start point and the end point of the domain. At step S37, the controller 17 acquires the information of the domain specified at step S36 (duration).

If, at step S35, the mark is verified not to be of the section type, the processing at steps S36, S37 is skipped.

If the private data (makers_private_data) is recorded at step S38, the data is input from terminal 27 through the user interface. So, the controller 17 acquires the data.

At step S39, the controller 17 formulates the information on the PlayListMark (FIG. 4) based on the data acquired by the above processing.

At step S40, the controller 17 controls the write unit 18 to record the PlayList file. Responsive to this command, the write unit 18 records the PlayList file on the recording medium 10.

Referring to FIG. 9, the processing for the moving picture recording and/or reproducing apparatus to reproduce the PlayList using the PlayListMark or ClipMark of the section-indicating type is explained.

At step S61, the user commands reproduction of one PlayList. As in the above case, this command is input from the user interface through terminal 27 to the controller 17.

At step S62, the user further commands the controller 17 to use a preset reproducing method employing the section type mark. For example, skipping a preset domain is here commanded.

At step S63, the controller 17 acquires the information on the PlayListMark (FIG. 4) relevant to the PlayList and the ClipMark (FIG. 5) as commanded at step S61. The information has been recorded on the recording medium 10 by the processing of FIGS. 7 and 8, as mentioned previously.

At step S64, the controller 17 acquires the mark data, required for the preset reproducing method, as commanded by the processing at step S62, from the information acquired by the processing at step S63.

At step S65, the controller 17 controls the readout unit 11 to reproduce an AV stream from the recording medium 10, based on the mark time stamp and the duration. The readout unit 11 operates under this control to reproduce the specified range of the AV stream from the recording medium 10.

At step S66, the controller 17 proceeds to process the reproduced picture based on the mark_private_data of the mark.

Although the MPEG2 transport stream is taken as an example of the multiplexed stream in the above-described embodiment, this is merely for the sake of illustration such that a DSS transport stream or the MPEG2 program stream may also be used as the multiplexed stream.

Moreover, although the Clip Information file and the PlayList file are managed as separate files, in the above-described embodiment, these information may be collected in one file for management. For example, an object comprised of the ClipMark information and an object comprised of the PlayListMark may be collected into one file for management.

It is also not imperative to manage data as a file, that is to manage data using a file system since it is only sufficient to manage data in such a form as to enable management by the moving picture recording and/or reproducing apparatus.

The recording and/or reproduction of the playback domain may be managed in a facilitated fashion, as described above. That is, when a playback domain has been selected, it is unnecessary to indicate the domain using two marks, namely a start mark and an end mark, so that the number of the mark information is not increased. Moreover, there is no necessity of managing the two domain-indicating marks in a paired fashion, thus facilitating the mark management in the recording and/or reproduction. Since there is no necessity of separately preparing a PlayList not desired by the user, such a user interface can be furnished which is intelligible more readily to the user.

It is moreover possible to provide the mark with the unique information on the maker of the recording and/or reproducing apparatus.

Although the above-described sequence of operations can be performed on a hardware, it may also be executed by the software. If the sequence of operations is to be executed on the software, the program forming the software is installed in a dedicated hardware built in a computer. Alternatively, the program forming the software is installed from the network or a recording medium in e.g., a general-purpose personal computer capable of executing various functions on installing various programs.

The recording medium is formed not only by a package medium, such as a magnetic disc 41, inclusive of a floppy disc, an optical disc 42, inclusive of a CD-ROM (Compact Disc-Read-Only memory) and DVD (Digital Versatile Disc), a magneto-optical disc 43, inclusive of MD (Mini-Disc), or a semiconductor memory 44, having the program pre-recorded thereon, and driven by a driver 31 connected in circuit as necessary, as shown in FIG. 6, but also by a ROM or a hard disc, having the program pre-recorded thereon and which is furnished to the user as it is built in the computer from the outset.

In the present specification, the steps stating the program recorded on the recording medium includes parallel processing or batch-wise processing, which is not necessarily executed chronologically, in addition to the processing in an explicitly stated sequence.

Moreover, in the present specification, a system denotes an entire apparatus, made up of plural devices.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

INDUSTRIAL APPLICABILITY

According to the present invention, when a user selects an optional playback domain from a given playlist to implement a function which accords a particular meaning to the domain, it becomes possible to carry out the recording and/or reproduction of the playback domain more readily.

Moreover, if a moving picture of an optional characteristic playback domain is selected from a given input AV stream to realize the function which accords a special meaning to the domain, the recording and/or reproduction of the playback domain can be managed extremely readily.

The invention claimed is:

1. An information processing apparatus comprising:
a signal analysis unit configured to detect a moving picture of a characteristic playback domain from an input AV stream;
a controller configured to independently generate a clip mark referenced by a playlist during reproduction of the AV stream, the clip mark having a time stamp of a playback start point of said playback domain, a duration of said playback domain and a system time clock information identifying a time-axis corresponding to the clip mark, the controller generating a clip mark identification information identifying a type of the clip mark;
an acquisition unit configured to acquire extension data from the signal analysis unit, the extension data specifying special reproduction of said playback domain to be performed based on contents of the extension data, the controller appending said extension data acquired by said acquisition unit to said clip mark; and
a writing unit configured to record said clip mark and clip mark identifying information on an information recording medium, the clip mark and the clip mark information being included in a clip information file corresponding to the AV stream,
wherein the recording medium contains the clip mark, the clip mark identification information and the AV stream.

2. An information processing apparatus according to claim 1, wherein said information recording medium is an optical disk.

3. An information processing apparatus according to claim 1, wherein said information recording medium can be removed from the information processing apparatus.

4. The information processing apparatus according to claim 1, wherein the extension data specifies skipping reproduction of the playback domain.

5. The information processing apparatus according to claim 1, wherein the extension data specifies one of fade-in reproduction and fade-out reproduction of the playback domain.

6. An information processing method for causing an information processing apparatus to manage the recording and reproduction of a playback domain, comprising:
detecting, in a signal analysis unit, a moving picture of a characteristic playback domain from an input AV stream;
independently generating, at a controller, a clip mark referenced by a playlist during reproduction of the AV stream, the clip mark having a time stamp of a playback start point of said playback domain and a duration of said playback domain, the clip mark including a system clock information identifying a time axis corresponding to the clip mark;

generating, at the controller, a clip mark identification information identifying a type of the clip mark;

acquiring, by an acquisition unit from the signal analysis unit, extension data specifying special reproduction of said playback domain to be performed based on contents of the extension data, the controller appending said extension data acquired by said acquisition unit to said clip mark; and recording, at a writing unit, said clip mark and clip mark identification information on an information recording medium, the clip mark and clip mark identification information being included in a clip information file corresponding to the AV stream, wherein the recording medium contains the clip mark, the clip mark identification information and the AV stream.

7. A storing computer-readable instructions thereon, said computer-readable instructions when executed by a processor cause the processor to perform the steps comprising:

detecting a moving picture of a characteristic playback domain from an input AV stream;

generating, independently, a clip mark referenced by a playlist during reproduction of the AV stream, the clip mark having a time stamp of a playback start point of said playback domain and a duration of said playback domain, the clip mark including a system clock information identifying a time axis corresponding to the clip mark;

generating a clip mark identification information identifying a type of the clip mark;

acquiring, based on the detecting, extension data specifying special reproduction of said playback domain to be performed based on contents of the extension data, the controller appending said extension data acquired by said acquisition unit to said clip mark; and recording said clip mark and clip mark identification information on an information recording medium, the clip mark and clip mark identification information being included in a clip information file corresponding to the AV stream, wherein the recording medium contains the clip mark, the clip mark identification information and the AV stream.

8. An information processing apparatus for reproducing an information recording medium having recorded thereon an AV stream, a clip mark referenced by a playlist during reproduction of the AV stream, the clip mark having a time stamp for a playback start point of a characteristic playback domain detected from said AV stream and a duration of said playback domain recorded thereon, said apparatus comprising:

a decoding unit configured to acquire said clip mark from said information recording medium, the decoding unit acquiring a clip mark identification information identifying a type of the clip mark and a system clock information included in the clip mark, the system clock information identifying a time axis corresponding to the clip mark; and a controller configured to control a processing of a plurality of information recorded on said information recording medium, based on said clip mark and clip mark identification information acquired by said decoding unit, the clip mark and clip mark identification information being included in a clip information file corresponding to the AV stream, wherein a playlist references the clip mark during reproduction of the AV stream, and the characteristic playback domain of the AV stream is reproduced according to extension data specifying special reproduction of said playback domain to be performed based on contents of the extension data, the extension data being appended to the clip mark based on analysis of the AV stream.

9. An information processing method for causing an information processing apparatus to reproduce an information recording medium having recorded thereon an AV stream, a clip mark referenced by a playlist during reproduction of the AV stream, the clip mark having a time stamp for a playback start point of a characteristic playback domain detected from said AV stream and a duration of said playback domain, said method comprising:

acquiring, at a decoding unit, said clip mark from said information recording medium;

acquiring, at the decoding unit, a clip mark identification information identifying a type of the clip mark and a system clock information identifying a time axis corresponding to the clip mark, the system clock information being included in the clip mark; and controlling, at a controller, a processing of a plurality of information recorded on said information recording medium, based on said clip mark and clip mark identification information, the clip mark and clip mark identification information being included in a clip information file corresponding to the AV stream, wherein the clip mark is referenced by a play list during reproduction of the AV stream, and the characteristic playback domain of the AV stream is reproduced according to extension data specifying special reproduction of said playback domain to be performed based on contents of the extension data, the extension data being appended to the clip mark based on an analysis of the AV stream.

10. A non-transitory computer-readable medium having stored thereon computer-readable instructions for an information processing apparatus for reproducing an information recording medium having recorded thereon an AV stream, a clip mark referenced by a playlist during reproduction of the AV stream, the clip mark having a time stamp for a playback start point of a characteristic playback domain detected from said AV stream and a duration of said playback domain recorded thereon, said computer-readable instructions when executed by a processor cause the processor to perform the steps comprising:

acquiring said clip mark from said information recording medium;

acquiring a clip mark identification information identifying a type of the clip mark and a system clock information identifying a time axis corresponding to the clip mark, the system clock information being included in the clip mark; and controlling the processing of the information recorded on said information recording medium, based on said clip mark and clip mark identification information, the clip mark and clip mark identification information being included in a clip information file corresponding to the AV stream, wherein the clip mark is referenced by a play list during reproduction of the AV stream, and the characteristic playback domain of the AV stream is reproduced according to extension data specifying special reproduction of said playback domain to be performed based on contents of the extension data, the extension data being appended to the clip mark based on analysis of the AV stream.

11. An information processing apparatus comprising:

a signal analysis unit configured to acquire an optional playback domain, as instructed by a user, from a playlist defining a combination of preset domains in an AV stream;

a controller configured to generate a playlist mark comprised of a set of a time stamp of a start point of said playback domain and a duration of said playback domain, the playlist mark being referenced by the playlist during reproduction of the AV stream, the controller generating a playlist mark identification information identifying a type of the playlist mark and identifying a play item in which the playlist mark is placed;

an acquisition unit configured to acquire extension data from the analysis unit, the extension data specifying special reproduction of said playback domain to be performed based on contents of the extension data, the controller appending said extension data acquired by said acquisition unit to said playlist mark; and a writing unit configured to record said playlist mark, playlist mark identification information and said AV stream on said information recording medium, the playlist mark and playlist mark identification information being included in a clip information file corresponding to the AV stream.

12. An information processing apparatus according to claim 11, wherein said information recording medium is an optical disk.

13. An information processing apparatus according to claim 11, wherein said information recording medium can be removed from the information processing apparatus.

14. An information processing method for causing an information processing apparatus to manage the recording and reproduction of a playback domain, comprising:

acquiring, at a signal analysis unit, an optional playback domain, as instructed by a user, from a playlist defining a combination of preset domains in an AV stream;

generating, at a controller, a playlist mark comprised of a set of a time stamp of a start point of said playback domain and a duration of said playback domain, the playlist mark being referenced by the playlist during reproduction of the AV stream;

generating, at the controller, a playlist mark identification information identifying a type of the playlist mark and identifying a play item in which the playlist mark is placed;

acquiring, by an acquisition unit from the signal analysis unit, extension data specifying special reproduction of said playback domain to be performed based on contents of the extension data, the controller appending said extension data acquired by said acquisition unit to said playlist mark; and recording, at a writing unit, said playlist mark and the playlist mark identification information on said information recording medium, the playlist mark and playlist mark identification information being included in a clip information file corresponding to the AV stream.

15. An information processing apparatus according to claim 14, wherein said information recording medium is an optical disk.

16. An information processing apparatus according to claim 14, wherein said information recording medium can be removed from the information processing apparatus.

17. A non-transitory computer-readable medium having stored thereon computer-readable instructions that when executed by a processor cause the processor to perform the steps comprising:

acquiring an optional playback domain, as instructed by a user, from a playlist defining a combination of preset domains in an AV stream;

generating a playlist mark comprised of a set of a time stamp of a start point of said playback domain and a duration of said playback domain, the playlist mark being referenced by the playlist during reproduction of the AV stream;

generating a playlist mark identification information identifying a type of the playlist mark and identifying a play item in which the playlist mark is placed;

acquiring, based on analysis of the playback domain, extension data specifying special reproduction of said playback domain to be performed based on contents of the extension data, the controller appending said extension data acquired by said acquisition unit to said playlist mark; and recording said playlist mark and the playlist mark identification information on said information recording medium, the playlist mark and playlist mark identification information being included in a clip information file corresponding to the AV stream, wherein the recording medium contains the playlist mark, playlist mark identification information and the AV stream.

18. An information processing apparatus for reproducing an information recording medium having recorded thereon an AV stream and a playlist mark including a set of a time stamp of a start point of an optional playback domain as instructed by a user from a playlist which gives a definition of combinations of preset domains in said AV stream, and a duration of said playback domain, said apparatus comprising:

a decoder unit configured to acquire said playlist mark from said information recording medium, the decoder unit acquiring a playlist mark identification information identifying a type of the playlist mark, the playlist mark identification information including identification of a play item in which the playlist mark is placed; and a controller configured to control a processing of a plurality of information recorded on said information recording medium based on the playlist mark and the playlist mark identification information, the playlist mark being referenced by the playlist during reproduction of the AV stream, the playlist mark and playlist mark identification information being included in a clip information file corresponding to the AV stream, wherein the optional playback domain of the AV stream is reproduced according to extension data specifying special reproduction of said playback domain to be performed based on contents of the extension data, the extension data being appended to the playlist mark based on analysis of the optional playback domain.

19. An information processing method for causing an information processing apparatus to reproduce an information recording medium having recorded thereon an AV stream and a playlist mark including a set of a time stamp of a start point of an optional playback domain as instructed by a user from a playlist which gives a definition of combinations of preset domains in said AV stream, and a duration of said playback domain, said method comprising:

acquiring, at a decoder unit, said playlist mark from said information recording medium, the playlist mark being referenced by the playlist during reproduction of the AV stream;

acquiring, at the decoder unit, a playlist mark identification information identifying a type of the playlist mark and identifying a play item in which the playlist mark is placed; and controlling, at a controller, a processing of a plurality of information recorded on said information recording medium based on the playlist mark and the playlist mark identification information, the playlist mark and playlist mark identification information being included in a clip information file corresponding to the AV stream, wherein the optional playback domain of the AV stream is reproduced according to extension data specifying special reproduction of said playback domain to be performed based on contents of the extension data, the extension data being appended to the playlist mark based on analysis of the optional playback domain.

20. A non-transitory computer-readable medium having stored thereon computer-readable instructions for an information processing apparatus reproducing an information recording medium having recorded thereon an AV stream and a playlist mark comprised of a set of a time stamp of a start point of an optional playback domain as instructed by a user from a playlist which gives a definition of combinations of preset domains in said AV stream, and a duration of said playback domain, said instructions when executed by a processor cause the processor to perform the steps comprising:

acquiring said playlist mark from said information recording medium, the playlist mark being referenced by the playlist during reproduction of the AV stream;

acquiring a playlist mark identification information identifying a type of the playlist mark and identifying a play item in which the playlist mark is placed; and controlling the processing of the information recorded on said information recording medium based on the playlist mark and playlist mark identification information, the playlist mark and playlist mark identification information being included in a clip information file corresponding to the AV stream, wherein the optional playback domain of the AV stream is reproduced according to extension data specifying special reproduction of said playback domain to be performed based on contents of the extension data, the extension data being appended to the playlist mark based on analysis of the optional playback domain.

* * * * *